United States Patent
Tanaka et al.

[19]

[11] Patent Number: 6,106,946
[45] Date of Patent: Aug. 22, 2000

[54] MICROCAPSULE CONTAINING MAGNETIC FLUID, MANUFACTURING METHOD, AND USE THEREOF

[75] Inventors: Koji Tanaka, Kashiwara; Toshihiko Shibamoto, Yao; Akihiko Nishizaki, Koriyama, all of Japan

[73] Assignees: Matsumoto Yushi-Seiyaku Co., Ltd., Yao; Nitto Boseki Co., LTD, Fukushima, both of Japan

[21] Appl. No.: 09/147,017

[22] PCT Filed: Mar. 4, 1997

[86] PCT No.: PCT/JP97/00646

§ 371 Date: Sep. 11, 1998

§ 102(e) Date: Sep. 11, 1998

[87] PCT Pub. No.: WO97/33686

PCT Pub. Date: Sep. 18, 1997

[30] Foreign Application Priority Data

Mar. 15, 1996 [JP] Japan .................................... 8-059244
Sep. 24, 1996 [JP] Japan .................................... 8-251903

[51] Int. Cl.[7] .............................. B01J 13/02; C09D 5/23; H01F 1/44
[52] U.S. Cl. .................................. 428/402.2; 428/402.22; 264/4.1; 264/4.3; 264/4.33; 264/4.7
[58] Field of Search ............................. 428/402.2, 402.22; 264/4.1, 4.3, 4.33, 4.7

[56] References Cited

U.S. PATENT DOCUMENTS 5,521,253  5/1996  Lee et al. .

5,593,680  1/1997  Bara et al. .

FOREIGN PATENT DOCUMENTS 62-286534  12/1987  Japan .
4-199085    7/1992  Japan .
4-296868   10/1992  Japan .
8-54841     2/1996  Japan .

*Primary Examiner*—Nathan M. Nutter
*Attorney, Agent, or Firm*—Armstrong, Westerman, Hattori, McLeland, & Naughton

[57] ABSTRACT

Provided are microcapsules enclosing therein a magnetic fluid, which are useful for imparting sound-absorbing and insulating ability to building materials, etc. by incorporation thereinto or adhesion thereto by means of an adhesive, and processes for producing the microcapsules. The heat-expandable microcapsule of the present invention comprises (i) a shell composed of a thermoplastic resin and (ii) a magnetic fluid which is a dispersion of magnetic substance fine particles having an average particle diameter of 5–200 nm in a hydrophobic organic solvent and a hydrophobic liquid foaming agent, both enclosed in the shell. The hollow microcapsule of the present invention comprises (i) a shell composed of a thermoplastic resin, and (ii) a magnetic fluid which is a dispersion of magnetic substance fine particles having an average particle diameter of 5–200 nm in a hydrophobic organic solvent and a vacant cell both included in the shell. The coating material of the present invention comprises at least one of these sound-absorbing and insulating microcapsules.

7 Claims, No Drawings

MICROCAPSULE CONTAINING MAGNETIC FLUID, MANUFACTURING METHOD, AND USE THEREOF

The present application is a national stage under 35 U.S.C.§371 of International Application PCT/JP97/00646 filed on Mar. 4, 1997.

TECHNICAL FIELD

The present invention relates to microcapsules enclosing a therein a magnetic fluid, which are useful for imparting sound-absorbing and insulating ability to building materials, etc., and to a process for producing the same.

BACKGROUND ART

Materials hitherto sued for imparting sound-absorbing and insulating ability to building materials, etc. include sound absorbing materials such as porous materials, plate-shaped materials, perforated plates, slits, resonators, and sound insulating materials such as single materials, for example, a PC plate, plate glass, lead sheet, sintered metal sheet, light-weight concrete or gypsum board, and hollow double structure materials or laminated panel structure materials comprising the above-mentioned materials.

However, in the case of a thin plate-shaped metal, a number of steps are required before it can be used as the final product: that is, after having been made into the form of a thin plate, it must be processed to a predetermined size and shape, sometimes be processed three-dimensionally, and further, be subject to assembling and fitting. In the case of a porous material or a foamed plastic, since they have predominantly continuous holes, they are poor in resistance to local load, have a rough surface, and tend to adsorb water and dust; further, their sound absorption property is low in the low- and medium-pitched sound ranges. The processability of sound insulation sheets comprising a synthetic resin, such as vinyl chloride resin, and metallic fillers or iron oxide particles incorporated thereinto, is poor, and moreover, they are brittle.

For the purpose of sound-proofing in the low- and medium-pitched sound ranges, for example, JP-A-5-279569 discloses a sound-proofing panel comprising a sandwich type panel with sand particles filled into the internal space of the panel. However, the panel has problems in that (i) it is difficult to fill sand particles into the internal space of the panel closely and without leaving clearance, and (ii) since sand is weighty, it is difficult to obtain light-weight panels. JP-A-5-279569 discloses a vibration-proofing material comprising a silicone gel having a specific pressure transfer characteristic and hollow microspheres made of an inorganic material, such as aluminosilicate, incorporate thereinto, JP-A-4-145174 discloses a vinyl chloride resin plastisol composition incorporated with hollow fillers, and JP-A-7-145331 discloses a water base coating material for vehicle constituent members comprising a water base coating composition and an organic hollow filler expandable upon heating or a specific amount of a foaming agent incorporated into the composition. However, these disclosures all aim at vibration proofing and dampening in the range of 100 Hz or less and teach nothing of sound absorption and insulation property.

DISCLOSURES OF THE INVENTION

The present invention has been achieved to resolve the above-mentioned problems. Thus, the magnetic fluid-enclosing microcapsule of the present invention comprises a shell and a magnetic fluid enclosed therein, the magnetic fluid being a dispersion of magnetic substance fine particles having an average particle diameter of 5–200 nm in a hydrophobic organic solvent and the shell being made of a thermoplastic resin. The heat-expandable microcapsule of the present invention comprises (i) a shell and (ii) a magnetic fluid and a hydrophobic liquid foaming agent both enclosed therein, the magnetic fluid being a dispersion of magnetic substance fine particles having an average particle diameter of 5–200 nm in a hydrophobic organic solvent and the shell being made of a thermoplastic resin. Further, the hollow microcapsule of the present invention comprises (i) a shell and (ii) a magnetic fluid and a vacant cell both included therein, the magnetic fluid being a dispersion of magnetic substance fine particles having an average particle diameter of 5–200 nm in a hydrophobic organic solvent and the shell being made of a thermoplastic resin. In particular, a hollow microcapsule wherein the magnetic fluid has the specific gravity (at 20° C.) of 1.0–1.6 and the vacant cell has the size of 5–300 $\mu$m is preferable since it is excellent in sound absorption and insulation property over the whole range of low-, medium- and high-pitched sounds. The coating composition of the present invention is characterized in that it contains at least one kind of these magnetic fluid-enclosing microcapsules.

The process for producing the heat-expandable microcapsule of the present invention comprises dispersing magnetic substance fine particles having an average particle diameter of 5–200 nm in a hydrophobic organic solvent to obtain a magnetic fluid, mixing the magnetic fluid with a hydrophobic liquid foaming agent and a polymerizable monomer to prepare a hydrophobic mixture (a), dispersing colloidal silica in water to obtain an aqueous mixture (b), then mixing the hydrophobic mixture (a) and the aqueous mixture (b), and subjecting the resulting mixture to suspension polymerization.

The magnetic fluid used in the present invention may favorably be obtained, for example, by adding an aqueous solution of a salt of a metal capable of forming a ferromagnetic substance to an aqueous alkali solution while keeping the pH of the alkali solution at 10 or above to form a liquid dispersion of ferromagnetic substance fine particles, mixing the liquid dispersion with an aqueous solution of a salt of a fatty acid (an aliphatic carboxylic acid) mixture of an aliphatic unsaturated carboxylic acid having 18 or more carbon atoms with an alicyclic carboxylic acid having 7 or more carbon atoms, the amount of the fatty acid mixture being just enough to form substantially a monomolecular layer on the surface of the ferromagnetic substance fine particles, then adjusting the pH of the resulting mixture to 6 or below by using an acid to obtain a dispersion of hydrophobic ferromagnetic fine particles having adsorbed the carboxylic acids, and then adding a hydrophobic organic solvent to the dispersion to transfer the hydrophobic ferromagnetic fine particles having adsorbed the carboxylic acids to the hydrophobic organic solvent layer.

The salt of a metal capable of forming a ferromagnetic substance is not particularly limited and may be a water-soluble salt, e.g., chloride, sulfate, etc., of ferrous, ferric, zinc, manganese, nickel, cobalt, calcium, copper, and the like. The above-mentioned aqueous salt solution is added with stirring to an aqueous alkali solution to form an oxide of the metal. The metal oxide is, for example, ferrite, magnetite, or the like and includes, for example, $FeO_{(1-n)} \cdot Fe_2O_{3(n)}$, $FeO_{(n)} \cdot Fe_2O_3$, $MnO_{(1-n)} \cdot ZnO_{(n)} \cdot Fe_2O_3$, $NiO_{(1-n)} \cdot ZnO_{(n)} \cdot Fe_2O_3$, $CoO_{(1-n)} \cdot FeO_{(n)} \cdot Fe_2O_3$. The particle diameter is preferably in the approximate range of 50–200 nm. When it is less than 5 nm, the saturation magnetization tends to be low, whereas when it exceeds 200 nm, the dispersion stability tends to be low. The content of the magnetic substance particles in the ferromagnetic fine particle liquid dispersion is preferably adjusted to about 2–15% by the weight.

The kind and the amount of the carboxylic acids to be adsorbed onto the ferromagnetic fine particle surface are important. The carboxylic acids used are preferably mixtures of an aliphatic unsaturated carboxylic acid having 18 or more carbon atoms and an alicyclic carboxylic acid having 7 or more carbon atoms. The aliphatic unsaturated carboxylic acid may be, for example, oleic acid, linolic acid, elaidic acid, erucic acid, etc., but is preferably one having a large molecular weight, particularly erucic acid. The alicyclic carboxylic acid may be, for example, naphthenic acid, abietic acid, etc., naphthenic acid being preferred, particularly one having an acid value of 100–300, preferably 160–240.

The ratio of the aliphatic unsaturated carboxylic acid to the alicyclic carboxylic acid may be varied depending upon the kind of the hydrophobic organic solvent used for dispersing the magnetic substance particles. When the hydrophobic organic solvent contains a high amount of alicyclic compounds and/or aromatic compounds, it is preferable to use an alicyclic carboxylic acid in a relatively larger proportion. The mixing ratio of the two kinds of acids is preferably selected in the range of from 2:8 to 8:2 (aliphatic:alicyclic) by weight.

By using the carboxylic acid mixture as described above, a dense carboxylic acid layer is formed on the magnetic substance particle surface and the dispersion stability of the magnetic fluid formed is markedly improved.

By using a combination of an aliphatic carboxylic acid and an alicyclic carboxylic acid, particularly erucic acid and naphthenic acid, and by further regulating properly the mixing ratio of the acids, the transfer of the magnetic substance particles into the hydrophobic organic solvent can be easily attained without attendant formation of an emulsion. Moreover, a magnetic fluid with a low water content can be obtained, and the oxidation of the magnetic substance particles and contamination by by-produced salts, which might occur during the dehydration step, can be substantially avoided. Furthermore, a magnetic fluid with a markedly improved thermal stability can be obtained.

The carboxylic acids are preferably used in an amount sufficient to form substantially a monomolecular film of the carboxylic acids on the magnetic substance particle surface. As the amount of the carboxylic acids increases over the above-mentioned amount, the viscosity of the magnetic fluid formed tends to increase and, as a result, a magnetic fluid with a high content of the magnetic substance particles tends to be difficult to obtain. On the other hand, as the amount becomes smaller than the above-mentioned amount, the transfer of the magnetic substance particles into the hydrophobic solvent tends to be incomplete and the dispersion stability of the magnetic fluid formed tends to be poor.

The hydrophobic organic solvent used is not particularly limited, but it is preferably a hydrocarbon solvent, such as n-hexane, cyclohexane, kerosene, paraffin oil, machine oil, motor oil and lubricating oil, and a fluorine-containing solvent, such as hydrofluorocarbon, perfluorocarbon, perfluoroether and hydrofluoroether. Thus, a magnetic fluid can be obtained which has a magnetic substance particle content of 2–55% by weight (in terms of ash), a low viscosity of about 10–30 cps (20° C.), and a good dispersion stability.

Polymerizable monomers preferably used for synthesizing the thermoplastic resin of the shell may be, for example, acrylic acid, methacrylic acid, itaconic acid, citraconic acid, maleic acid, fumaric acid, and vinylbenzoic acid; esters, amides and nitriles of these acids; vinylaromatic compounds, such as styrene, methylstyrene, ethylstyrene and chlorostyrene; vinyl compounds, such as vinyl chloride and vinyl acetate; vinylidene compounds, such as vinylidene chloride; and dienes, such as divinylbenzene, isoprene, chloroprene and butadiene. Particularly preferred polymerizable monomers are acrylic acid or methacrylic acid and the esters or nitriles thereof and vinylidene compounds. Since the homopolymers and copolymers of these monomers are thermoplastic and have a good gas barrier property, they are particularly preferred as the thermoplastic resin.

The hydrophobic liquid foaming agent may be, for example, low molecular weight hydrocarbons, such as ethane, ethylene, propane, propene, butane, isobutane, butene, isobutene, pentane, isopentant, neopentane, hexane and heptane; chlorofluorocarbons, such as $CCl_3F$, $CCl_2F_2$, $CClF_3$ and $CClF_2$—$CClF_2$; hydrofluorocarbons, such as $CH_2FCF_3$, $CH_3CHF_2$ and $CHF_2CF_3$; perfluorocarbons, such as $C_5F_{12}$ and $C_6F_{14}$; hydrofluoroethers, such as $C_4H_9OCH_3$ and $C_4H_9OC_2H_5$; and silane compounds, such as tetramethylsilane and trimethylethylsilane. Particularly preferred are low boiling point organic solvents, for example, low molecular weight hydrocarbons having a boiling point of −2° C. to ±50° C., such as butene, isobutane, isobutene, pentane, isopentane and neopentane. When hexane is used as the hydrophobic liquid foaming agent, it is favorable in that it serves also as the hydrophobic organic solvent which disperses the magnetic substance fine particles.

When microcapsules or heat-expandable microcapsules having an average particle diameter of 10 μm or less are to be produced, it is preferable that a compound having a hydrophilic group and a long-chain hydrocrabon group is included the polymerization system. Examples of the compound having a hydrophilic group and a long-chain hydrocarbon group preferably used include long-chain alcohols, long-chain fatty acids (aliphatic carboxylic acids), long-chain amines, long-chain amides and esters of a polyhydric alcohol and the long-chain fatty acid. The long-chain hydrocarbon group is preferably one having 8–18 carbon atoms, which may further have another substituents, such as halogen. Addition of a long-chain alcohol having 8–18 carbon atoms to the aqueous mixture is more preferable because microcapsules with a uniform particle diameter can be produced.

The compound having a hydrophilic group and a long-chain hydrocarbon group is used in an amount of preferably 0.1–10 parts by weight, more preferably 0.5–5 parts by weight, per 100 parts by weight of the polymerizable monomer. The compound may be used either dissolved in the monomer or dissolved in the low boiling point organic solvent, or it may be added singly to the aqueous medium independently from the two.

When the amount of the compound is less than 0.1 part by weight, it is sometimes difficult to prepare microcapsules of a small particle diameter of 10 μm or less by using an ordinary stirring power.

The method, per se, used for preparing the present microcapsules may be a conventional one except for using the above-mentioned magnetic fluid. Thus, the magnetic fluid, polymerizable monomer and, if necessary, the hydrophobic liquid foaming agent are suspended in water in the presence of a polymerization catalyst and, if necessary, the compound having a hydrophilic group and a long-chain hydrocarbon group to conduct polymerization; alternatively, a polymerization may be conducted while adding the monomer gradually to an aqueous medium containing the hydrophobic starting materials suspended therein, or while adding the liquid mixture of the two gradually to the reaction system. The polymerization is preferably conducted in an autoclave, the inner atmosphere of which has been replaced with an inert gas, at a preferred temperature in the range of 40–80° C. The polymerization catalyst used may be a conventionally used radical polymerization initiator and includes, for example, peroxide catalysts, such as benzoyl peroxide, tert-butyl perbenzoate, cumene hydroperoxide, tert-butyl peracetate, lauroyl peroxide and diisopropyl peroxydicarbonate; azonitrile compounds, such as azobisdimethylvaleronitrile and azobisisobutyronitrile; and azo compounds, such as azoamide compounds and alkylazo compounds.

For suspending the monomer and the low boiling point organic solvent, a suspending agent, e.g., methyl cellulose, hydroxymethyl cellulose, carboxymethyl cellulose and colloidal silica, may also be used. The suspension is preferably conducted with vigorous stirring. The method and conditions of stirring may differ depending upon the kind of the stirrer, the size and shape of the reaction vessel, and the intended particle diameter of the microcapsule, but the suspension is preferably conducted by using a homogenizer, such as a T.K. Homomixer (mfd. by Tokushukika K.K.). When the T.K. Homomixer is used, it is preferably operated at about 3,000–10,000 rpm.

The process for producing the hollow microcapsule of the present invention comprises subjecting the heat-expandable microcapsule to an expansion by heat at a temperature higher than the boiling point of the hydrophobic liquid foaming agent. A preferred process comprises preheating the microcapsule at a temperature lower than the boiling point of the hydrophobic liquid foaming agent, then subjecting the microcapsule to an expansion by heat, followed by quenching, because then a hollow microcapsule can be produced which hardly undergoes deformation and fracture in the post-processing, such as kneading with resin and heat molding. Thus, though the hollow microcapsule of the present invention can be obtained by heating the heat-expandable microcapsule, prepared as described above, by a conventional method, it is preferably obtained by dispersing the heat-expandable microcapsules in a liquid having a boiling point higher than the expansion temperature to form a slurry, then heating the slurry at a temperature higher than the expansion temperature to effect expansion of the microcapsule, and quenching the slurry to a temperature lower than the expansion temperature.

When particles of an inorganic substance, such as calcium carbonate, talc and titanium oxide, are incorporated, hollow microcapsules with a good fluidity can be produced by effecting heat expansion while preventing the sticking of the capsules by fusion, and the amount of the hydrophobic liquid foaming agent used may be controlled so as to give a volume expansion ratio of preferably 2 to 200-folds, more preferably 3 to 100-folds. When the ratio is less than 2-folds, the effect of attaining light-weight capsules by virtue of hollow cells tends to be insufficient, whereas when it exceeds 200-folds, the resulting hollow microcapsule tends to be susceptible to deformation by external force. Hollow microcapsules wherein the magnetic fluid has the specific gravity of 1.0–1.6 (at 20° C.) and the vacant cell has the size of 5–300 $\mu$m are preferable because they are excellent in sound absorption and insulation property over the whole range of low-, medium- and high-pitched sounds.

The microcapsules of the present invention are favorably used as sound absorbing and insulating composite boards obtained by laminating sheet-shaped materials, which are prepared by adhering these microcapsules (i) to paper, fabric, such as woven fabric and non-woven fabric, and resin sheets, using an adhesive, or (ii) to a resin, coating material and the like, onto a laminating material, e.g., a wooden plate, gypsum board, lath board, concrete panel, metal plate, such as iron plate, and flexible board. Such composite boards are useful for imparting sound-absorbing and insulating ability to electric appliances, transportation vehicles, such as automobiles, and building materials. Moreover, sheet-formed materials and building materials obtained by using the microcapsules of the present invention have characteristic features of light weight capability of being nailed, smooth surface and good resistance to local load. When the hollow microcapsules of the present invention are incorporated into a thermoplastic resin, it is preferable to use microcapsules of relatively small particle diameter of 50 $\mu$m or less to avoid deformation of the microcapsules at the time of kneading, and when the temperature of kneading and molding is 150° C. or above, it is preferable to use microcapsules which have been preheated and then heat-expanded and hence do not undergo degassing. Since the microcapsules of the present invention enclose a magnetic fluid therein, they have also an electromagnetic wave absorbing effect and are useful also as electric wave absorbing materials.

BEST MODE FOR CARRYING OUT THE INVENTION

The present invention is described in more detail below with reference to Examples and Comparative Examples, but the invention is in no way limited thereto. The method of evaluation used in the Examples is as follows.

Sound absorption and insulation property: the property is evaluated by determining the sound transmission loss at center frequencies of 125 Hz, 500 Hz, 1,000 Hz and 2,000 Hz according to JIS A 1416.

COMPARATIVE EXAMPLE 1

Into 100 parts by weight of vinyl chloride resin was mixed 50 parts by weight of a flame retarding plasticizer and the resulting mixture was processed in a conventional manner to obtain a vinyl chloride resin sheet (thickness 0.9 mm, surface density 2.3).

COMPARATIVE EXAMPLE 2

Into 100 parts by weight of vinyl chloride resin were mixed 50 parts by weight of a flame retarding plasticizer and 600 parts by weight of magnetite having a particle diameter of 25 nm, and the resulting mixture was processed in a conventional manner to obtain a vinyl chloride resin sheet (thickness 1.0 mm, surface density 3.3) containing iron oxide powder. The sheet was apt to be cracked by local load and had a rough surface.

EXAMPLE 1

First, an oily mixture and an aqueous mixture were prepared by the following methods.
Ingredients of oil mixture and mixing amount (parts by weight)
Vinylidene chloride (180), acrylonitrile (120), PEG #200 diacrylate (1.2), diisopropyl peroxydicarbonate (3), magnetic fluid (magnetite having absorbed naphthenic acid with a particle diameter of 10 nm dispersed in paraffin oil, magnetite content (in terms of ash) 42% by weight, specific gravity 1.3) (12)

Ingredients of aqueous mixture (pH 3) and mixing amounts (parts by weight)

Ion-exchanged water (600), colloidal silica liquid dispersion (20% solid) (130), 50% aqueous solution of a diethanol amine-adipic acid condensation product (1.7)

The oily mixture and the aqueous mixture prepared above were mixed, then treated by using a Homomixer (M-type, mfd. by Tokushukika K.K.) at 4,000 rpm for 110 seconds to effect dispersion, and the dispersion was flushed with nitrogen. The dispersion was subjected to polymerization in a 2-l autoclave at a pressure of 3–4 kg/cm$^2$ and a temperature of 55° C. for 20 hours. The magnetic fluid-enclosing microcapsule (MC 1) thus obtained had an average particle diameter of 20 $\mu$m, magnetite content of 1.4% by weight and specific gravity of 1.3.

Then, the same procedures as in Comparative Example 2 were followed except that 150 parts by weight of the microcapsule (MC 1) was used in place of 600 parts by weight of magnetite, to obtain a sound absorbing and insulating vinyl chloride resin sheet (thickness 1.8 mm, surface density 2.3).

weight of magnetite, to obtain a sound absorbing and insulating vinyl chloride resin sheet (thickness 3.0 mm, surface density 0.11).

EXAMPLE 3

The same procedures as in Example 2 were followed except that a magnetic fluid (dispersion of magnetite having adsorbed naphthenic acid in alkylnaphthalene, magnetite content 45% by weight, specific gravity 1.5) was used, to obtain a heat-expandable microcapsule (MC 4), a hollow microcapsule (MC 5, average particle diameter 36 $\mu$m) prepared therefrom, and a sound-absorbing and insulating vinyl chloride resin sheet.

EXAMPLE 4

The same procedures as in Example 2 were followed except that a magnetic fluid (dispersion of magnetite having adsorbed naphthenic acid with a particle diameter of 25 nm in alkylnaphthalene, magnetite content 45% by weight, specific gravity 1.6) was used, to obtain a heat-expandable microcapsule (MC 6), a hollow microcapsule (MC 7, average particle diameter 36 $\mu$m) obtained therefrom, and a sound-absorbing and insulating vinyl chloride resin sheet.

TABLE 1

Sound absorption and insulation property of hollow microcapsule and sheet-shaped material

| Test No. | Comparative Example 1 | Comparative Example 2 | Example 1 | Example 2 | Example 3 | Example 4 |
|---|---|---|---|---|---|---|
| Magnetic fluid-enclosing microcapsule | | | MC1 | MC3: Hollow | MC5: Hollow | MC7 Hollow |
| Average particle diameter ($\mu$m) | | | 20 | 36 | 36 | 36 |
| Magnetic substance particle content (wt %) | (0) | (100) | 20 1.4 | 36 1.4 | 36 1.5 | 36 1.5 |
| Vinyl chloride resin sheet | | | | | | |
| Magnetic substance particle content (wt %) | 0 | 80 | 0.7 | 0.5 | 0.5 | 0.5 |
| Thickness (mm) | 1.8 | 1.0 | 1.8 | 3.0 | 3.0 | 3.0 |
| Surface density (kg/m$^2$) | 2.3 | 3.3 | 2.3 | 0.11 | 0.11 | 0.11 |
| Sound absorption and insulation property (dB) | | | | | | |
| Sound transmission loss at 125 Hz | 8 | 11 | 17 | 19 | 20 | 20 |
| Sound transmission loss at 500 Hz | 14 | 16 | 21 | 24 | 24 | 25 |
| Sound transmission loss at 1,000 Hz | 19 | 21 | 24 | 28 | 28 | 28 |
| Sound transmission loss at 2,000 Hz | 24 | 25 | 28 | 32 | 33 | 33 |

EXAMPLE 2

The same procedures as in Example 1 were followed except that isopentane (45) was added to the oily mixture and the number of rotation of the Homomixer was changed to 8,000 rpm, to obtain a heat-expandable microcapsule (MC 2, average particle diameter 8 $\mu$m, magnetic fluid content 3.3% by weight, specific gravity 1.15, maximum expansion ratio (average particle diameter) 4.6-folds).

Then the heat-expandable microcapsule (MC-2) was mixed with calcium carbonate powder, the mixture was preheated in a hot air stream at 80° C. for 60 seconds and then heated in a hot air stream at 145° C. for 30 seconds to effect expansion by heat, whereby a hollow microcapsule (MC 3), having an average particle diameter of 36 $\mu$m was obtained.

Then the same procedures as in Comparative Example 2 were followed except that 100 parts by weight of the hollow microcapsule (MC 3) was used in place of 600 parts by

EXAMPLES 5–12, COMPARATIVE EXAMPLES 3–10

(Preparation of coating material)

Coating materials were prepared according to the formulations of Examples and Comparative Examples as shown in Tables 2–3, and respectively adjusted to a viscosity of about 40,000 cps.

1. Magnetic fluid-enclosing heat-expandable microcapsule:

The same procedures as in Example 1 were followed except that isopentane (45) was added to the oily mixture and it was changed to vinylidene chloride (120) and acrylonitrile (180), to obtain a heat expandable microcapsule (MC 8).

Magnetic fluid: 6 wt %
Magnetite content: 2.5 wt %
Average particle diameter: 20 $\mu$m
Maximum expansion ratio (average particle diameter): 2.5-folds 2. Heat-expandable microcapsule:

The same procedures as described above were followed except that no magnetic fluid was incorporated into the oily mixture, to obtain a heat-expandable microcapsule (MC 9).

Average particle diameter: 20 μm

Maximum expansion ratio (average particle diameter): 2.5-folds

3. Magnetic fluid-enclosing microcapsule foamed body:

The magnetic fluid-enclosing heat-expandable microcapsule (MC 8) was preheated in a hot air stream at 80° C. for 60 seconds and then heated in a hot air stream at 150° C. for 1 minute to effect expansion by heat (MC 10).

Magnetite content: 2.5 wt %

Average particle diameter: 50 μm

4. Microcapsule foamed body:

The heat-expandable microcapsule (MC 9) was preheated in a hot air stream at 80° C. for 60 seconds and then heated in a hot air stream at 150° C. for 1 minute to effect expansion by heat (MC 11).

Average particle diameter: 50 μm

5. Vinyl chloride resin for paste:

ZEST-38J (a trade name, mfd. by Shin Daiichi Enbi K.K.)

6. Acrylic emulsion resin:

Acryset 110E (a trade name, mfd. by Nippon Shokubai K.K.) (50% solid)

7. Calcium carbonate.

Hakuenka CCR (a trade name, mfd. by Shiroishi Calcium K.K.)

8. Silica gel

A-200 (a trade name, mfd. by Nippon Aerosil K.K.)

9. Alkali-soluble acrylic emulsion:

Primal ASE-60 (a trade name, mfd. by Nippon Acryl K.K.)

10. Polyamide resin:

Product obtained by pulverizing Versamid 335 (a trade name, mfd. by Henkel-Hakusui K.K.) and passing through a 100 mesh sieve 11. Magnetic fluid:

dispersed product of magnetite having adsorbed naphthenic acid (naphthenic acid-adsorbed magnetite) with a particle diameter of 10 nm in paraffin oil, magnetite content 42 wt % (in terms of ash), specific gravity 1.3.

(Coating)

Each of the coating materials was spray-coated on a steel sheet base material of 0.8 mm thickness, which had been subjected to cathode electrode position coating, by using an airless pump in a coating film thickness of 400 μm in the case of the heat-expandable microcapsule-containing coating material, and in a coating film thickness of 800 μm in the case of the coating material containing the foam body obtained by expanding the heat-expandable microcapsule. Subsequently, the coated steel sheet was baked in an oven at 140° C. for 30 minutes.

The coating film thus obtained was examined by the following methods. As the result, it was revealed that a chipping-resistant coating excellent in sound absorption and insulation property can be formed from the chipping-resistant coating materials incorporated with the magnetic fluid-enclosing microcapsule of the present invention.

Coating film surface blistering

The presence of surface blistering of the coating film after baking was examined.

Surface blistering ○: absent, Δ: slightly present, x: present

Coating film cracking

The presence of coating film cracking of the coating film after baking was examined.

Coating film cracking ○: absent, Δ: slightly present, x: present

Coating film elongation (%)

The coating film elongation (%) of the coating film after baking was determined according to JIS K 7127.

Test piece: No. 2 dumbbell, coating film thickness: 0.7 mm, distance between bench marks: 25 mm, distance between clamps: 80 mm, stretching speed: 50 mm/min.

Chipping resistance

The coated steel sheet was fixed at a degree of 45° with the coated surface after baking upward. Onto the coated surface was applied the lower end of a vertically standing vinyl chloride resin pipe with an inner diameter of 20 mm and a length of 2 m, and a JIS M-4 nut was dropped from the upper end through the pipe. The chipping resistance was expressed in terms of the total weight of nuts dropped until the pint of time when the base metal of the specimen came to be exposed.

EXAMPLE 13

A vinyl chloride resin plastisol incorporated with (incorporating) the magnetic fluid-enclosing heat-expandable microcapsule (MC 8) used in Example 9 was coated in a coated film thickness of 1 mm on a FRP plate of 3 mm thickness using glass fiber, and then foamed by heating at 140° C. for 10 minutes to obtain a coating film of 2 mm thickness.

The original FRP plate and the coated FRP plate obtained above were each worked into a 77 mmΦ coaxial pipe, and the electromagnetic wave transmission loss was determined by means of the coaxial pipe test. AS the result, with the coated FRP plate, transmission loss was observed at 900 MHz or more, and a value of −2 dB was obtained at 2,000 MHz. With the original FRP plate, on the other hand, no transmission loss was observed.

TABLE 2

Evaluation of coating film and coating material incorporated with magnetic fluid-enclosing microcapsule

| Test No. | Example | | | | Comparative Example | | | |
| --- | --- | --- | --- | --- | --- | --- | --- | --- |
| | 5 | 6 | 7 | 8 | 3 | 4 | 5 | 6 |
| Magnetic fluid-enclosing heat-expandable microcapsule (MC8) | 6 | 6 | 0 | 0 | 0 | 0 | 0 | 0 |
| Heat-expandable microcapsule (MC9) | 0 | 0 | 0 | 0 | 6 | 6 | 0 | 0 |
| Magnetic fluid-enclosing microcapsule foamed body (MC10) | 0 | 0 | 6 | 6 | 0 | 0 | 0 | 0 |
| Microcapsule foamed body (MC11) | 0 | 0 | 0 | 0 | 0 | 0 | 6 | 6 |
| Vinyl chloride resin for paste | 25 | 0 | 25 | 0 | 25 | 0 | 25 | 0 |

TABLE 2-continued

Evaluation of coating film and coating material incorporated with magnetic fluid-enclosing microcapsule

| Test No. | Example | | | | Comparative Example | | | |
|---|---|---|---|---|---|---|---|---|
| | 5 | 6 | 7 | 8 | 3 | 4 | 5 | 6 |
| Acrylic emulsion resin | 0 | 65 | 0 | 65 | 0 | 65 | 0 | 65 |
| Plasticizer: diisononyl phthalate | 25 | 0 | 25 | 0 | 25 | 0 | 25 | 0 |
| Filler: calcium carbonate | 30 | 34 | 30 | 34 | 30 | 34 | 30 | 34 |
| carbon black | 4 | 4 | 4 | 4 | 4 | 4 | 4 | 4 |
| Thickener: silica gel | 5 | 10 | 5 | 10 | 5 | 10 | 5 | 10 |
| Alkali-soluble acrylic emulsion | 0 | 5 | 0 | 5 | 0 | 5 | 0 | 5 |
| Reinforcement: polyamide resin | 5 | 5 | 5 | 5 | 5 | 5 | 5 | 5 |
| Film-forming assistant: cellosolve acetate | 0 | 1 | 0 | 1 | 0 | 1 | 0 | 1 |
| Magnetic fluid: | 0 | 0 | 0 | 0 | 0.53 | 0 | 0.53 | 0 |
| Magnetite, particle diameter 25 nm | 0 | 0 | 0 | 0 | 0 | 0.24 | 0 | 0.24 |
| Water | 0 | 37 | 0 | 37 | 0 | 37 | 0 | 37 |
| Total (parts by weight) | 100 | 167 | 100 | 167 | 101 | 167 | 101 | 167 |
| Solid content (wt %) | 100 | 60 | 100 | 60 | 100 | 60 | 100 | 60 |
| Magnetic substance particle content (wt %) | 0.24 | 0.24 | 0.24 | 0.24 | 0.24 | 0.24 | 0.24 | 0.24 |
| Coating film specific gravity | 1.05 | 1.03 | 1.06 | 1.02 | 1.01 | 1.05 | 1.03 | 1.06 |
| Film thickness (mm) | 0.7 | 0.7 | 0.7 | 0.7 | 0.7 | 0.7 | 0.7 | 0.7 |
| Surface blistering/coating film cracking | o/o | o/o | o/o | o/o | Δ/Δ | o/Δ | o/Δ | o/Δ |
| Coating film elongation (%) | 105 | 102 | 110 | 107 | 88 | 75 | 85 | 78 |
| Chipping resistance (kg) | 65 | 62 | 68 | 69 | 60 | 58 | 60 | 56 |
| Sound absorption and insulation property (dB) | | | | | | | | |
| Sound transmission loss at 125 Hz | 6 | 7 | 7 | 6 | 3 | 2 | 3 | 3 |
| Sound transmission loss at 500 Hz | 11 | 12 | 11 | 13 | 8 | 8 | 9 | 6 |
| Sound transmission loss at 1,900 Hz | 18 | 18 | 19 | 19 | 11 | 10 | 12 | 13 |
| Sound transmission loss at 2,000 Hz | 24 | 21 | 22 | 22 | 13 | 11 | 12 | 13 |

TABLE 3

Evaluation of coating film and coating material incorporated with magnetic fluid-enclosing microcapsule

| Test No. | Example | | | | Comparative Example | | | |
|---|---|---|---|---|---|---|---|---|
| | 9 | 10 | 11 | 12 | 7 | 8 | 9 | 10 |
| Magnetic fluid-enclosing heat-expandable microcapsule (MC8) | 10 | 10 | 0 | 0 | 0 | 0 | 0 | 0 |
| Heat-expandable microcapsule (MC9) | 0 | 0 | 0 | 0 | 6 | 6 | 0 | 0 |
| Magnetic fluid-enclosing microcapsule foamed body (MC10) | 0 | 0 | 10 | 10 | 0 | 0 | 0 | 0 |
| Microcapsule foamed body (MC11) | 0 | 0 | 0 | 0 | 0 | 0 | 6 | 6 |
| Vinyl chloride resin for paste | 25 | 0 | 25 | 0 | 25 | 0 | 25 | 0 |
| Acrylic emulsion resin | 0 | 65 | 0 | 65 | 0 | 65 | 0 | 65 |
| Plasticizer: diisononyl phthalate | 25 | 0 | 25 | 0 | 25 | 0 | 25 | 0 |
| Filler: calcium carbonate | 26 | 30 | 26 | 30 | 30 | 34 | 30 | 34 |
| carbon black | 4 | 4 | 4 | 4 | 4 | 4 | 4 | 4 |
| Thickener: silica gel | 5 | 10 | 5 | 10 | 5 | 10 | 5 | 10 |
| Alkali-soluble acrylic emulsion | 0 | 5 | 0 | 5 | 0 | 5 | 0 | 5 |
| Reinforcement: polyamide resin | 5 | 5 | 5 | 5 | 5 | 5 | 5 | 5 |
| Film-forming assistant: cellosolve acetate | 0 | 1 | 0 | 1 | 0 | 1 | 0 | 1 |
| Magnetic fluid: | 0 | 0 | 0 | 0 | 0 | 0 | 0 | 0 |
| Magnetite, particle diameter 25 nm | 0 | 0 | 0 | 0 | 0 | 0 | 0 | 0 |
| Water | 0 | 37 | 0 | 37 | 0 | 37 | 0 | 37 |
| Total (parts by weight) | 100 | 167 | 100 | 167 | 100 | 167 | 100 | 167 |
| Solid content (wt%) | 100 | 60 | 100 | 60 | 100 | 60 | 100 | 60 |
| Magnetic substance particle content (wt %) | 0.40 | 0.40 | 0.40 | 0.40 | 0 | 0 | 0 | 0 |
| Coating film specific gravity | 1.00 | 0.99 | 1.01 | 1.00 | 1.02 | 1.01 | 1.02 | 1.02 |
| Film thickness (mm) | 0.7 | 0.7 | 0.7 | 0.7 | 0.7 | 0.7 | 0.7 | 0.7 |
| Surface blistering/coating film cracking | o/o | o/o | o/o | o/o | o/o | o/o | o/o | o/o |
| Coating film elongation (%) | 100 | 101 | 102 | 101 | 105 | 103 | 106 | 103 |

TABLE 3-continued

Evaluation of coating film and coating material incorporated with magnetic fluid-enclosing microcapsule

|  | Example | | | | Comparative Example | | | |
|---|---|---|---|---|---|---|---|---|
| Test No. | 9 | 10 | 11 | 12 | 7 | 8 | 9 | 10 |
| Chipping resistance (kg) | 66 | 62 | 65 | 68 | 69 | 68 | 74 | 69 |
| Sound absorption and insulation property (dB) | | | | | | | | |
| Sound transmission loss at 125 Hz | 8 | 9 | 9 | 8 | 4 | 3 | 4 | 3 |
| Sound transmission loss at 500 Hz | 12 | 14 | 15 | 16 | 7 | 7 | 8 | 6 |
| Sound transmission loss at 1,900 Hz | 25 | 26 | 29 | 28 | 11 | 11 | 12 | 11 |
| Sound transmission loss at 2,000 Hz | 29 | 28 | 29 | 30 | 13 | 12 | 13 | 12 |

Industrial Applicability

The microcapsule, heat-expandable microcapsule and hollow microcapsule which enclose a magnetic fluid therein according to the present invention have an excellent sound-absorbing and insulating ability, and sheet-shaped materials obtained by incorporating these microcapsules into resins or coating materials or applying the coating materials or adhering the microcapsules by using an adhesive onto base sheet materials are excellent in sound absorption and insulation property, are resistant to local load, and have a smooth surface which hardly adsorbs water and dust. Accordingly, they are useful for imparting good sound absorption and insulation property to electric appliances, transportation vehicles such as automobiles and building materials.

What is claimed is:

1. A magnetic fluid-enclosing microcapsule comprising a shell and a magnetic fluid enclosed therein, the magnetic fluid being a dispersion of magnetic substance fine particles, which have an average particle diameter of 5–200 nm and onto a surface of which an aliphatic unsaturated carboxylic acid and an alicyclic carboxylic acid are adsorbed, in a hydrophobic organic solvent and the shell being composed of a homopolymer or copolymer of monomers having a nitrile functionality and/or a vinylidene compound.

2. A heat-expandable microcapsule comprising a shell and a magnetic fluid and a hydrophobic liquid foaming agent both enclosed therein, the magnetic fluid being a dispersion of magnetic substance fine particles, which have an average particle diameter of 5–200 nm and onto a surface of which an aliphatic unsaturated carboxylic acid and an alicyclic carboxylic acid are adsorbed, in a hydrophobic organic solvent and the shell being composed of a thermoplastic resin.

3. A hollow microcapsule comprising a shell and a magnetic fluid and a vacant cell both included therein, the magnetic fluid being a dispersion of magnetic substance fine particles, which have an average particle diameter of 5–200 nm and onto a surface of which an aliphatic unsaturated carboxylic acid and an alicyclic carboxylic acid are adsorbed, in a hydrophobic organic solvent and the shell being composed of a thermoplastic resin.

4. The hollow microcapsule according to claim 3 wherein the magnetic fluid has a specific gravity at 20° C. of 1.0–1.6 and the vacant cell has a size of 5–300 μm.

5. A process for producing a heat-expandable microcapsule which comprises dispersing magnetic substance fine particles, which have an average particle diameter of 5–200 nm and onto a surface of which an aliphatic unsaturated carboxylic acid and an alicyclic carboxylic acid are adsorbed, in a hydrophobic organic solvent to obtain a magnetic fluid, mixing the magnetic fluid with a hydrophobic liquid foaming agent and a polymerizable monomer to prepare a hydrophobic mixture (a), dispersing colloidal silica in water to obtain an aqueous mixture (b), then mixing the hydrophobic mixture (a) and the aqueous mixture (b) and subjecting the resulting mixture to suspension polymerization.

6. A process for producing a hollow microcapsule which comprises: preparing a heat-expandable microcapsule by the process according to claim 5, and subjecting the heat-expandable microcapsule to expansion by heat at a temperature higher than the boiling point of the hydrophobic liquid foaming agent.

7. A coating composition which comprises at least one of the microcapsules according to claim 1, 2 or 3.

* * * * *